Figure 10:
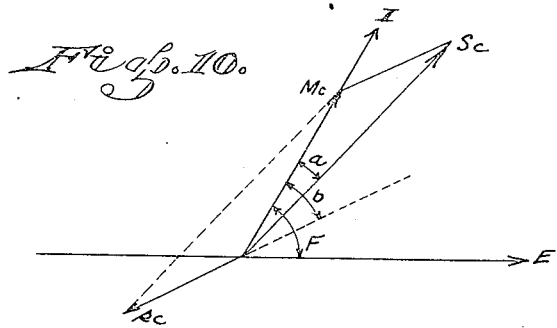

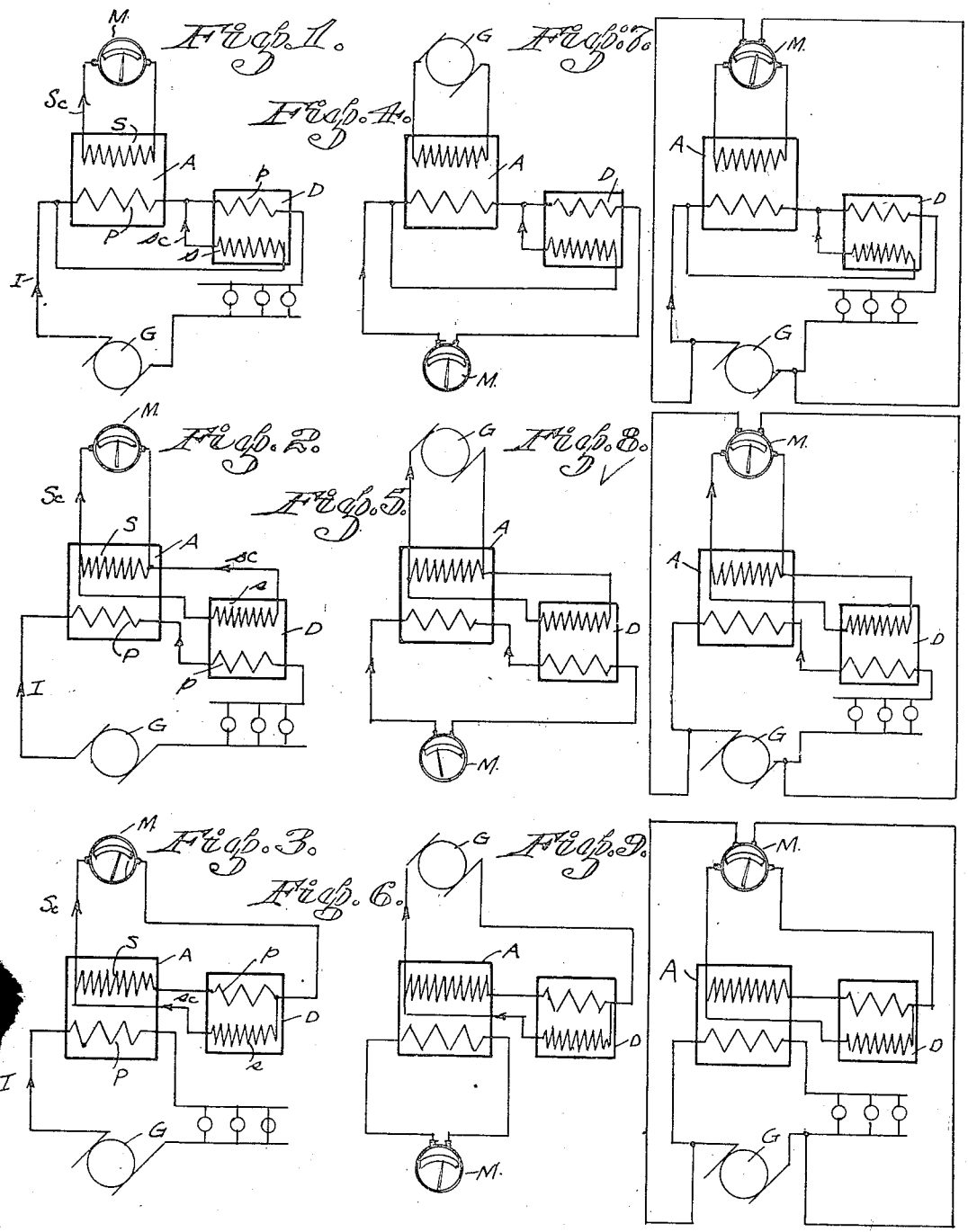

O. A. KNOPP.
ELECTRICAL MEASURING DEVICE.
APPLICATION FILED MAR. 2, 1917.

1,399,968.

Patented Dec. 13, 1921.
2 SHEETS—SHEET 2.

INVENTOR.
Otto A. Knopp.
BY
Baldwin Vale
ATTORNEY.

UNITED STATES PATENT OFFICE.

OTTO A. KNOPP, OF OAKLAND, CALIFORNIA.

ELECTRICAL MEASURING DEVICE.

1,399,968.   Specification of Letters Patent.   Patented Dec. 13, 1921.

Application filed March 2, 1917. Serial No. 151,895.

*To all whom it may concern:*

Be it known that I, OTTO A. KNOPP, a citizen of the United States, residing in the city of Oakland, county of Alameda, and State of California, have made a new and useful invention—to wit, Improvement in Electrical Measuring Devices; and I do declare the following to be a full, clear, concise, and exact description of the same.

In this specification and the annexed drawings, the invention is illustrated in the form considered to be the best, but it is to be understood that the invention is not limited to such form because it may be embodied in other forms, and it is also to be understood that in and by the claims following the description, it is desired to cover the invention in whatever form it may be embodied.

Among the objects of this invention are to provide more accurate methods and suitable means for measuring electricity by means of electric meters where due to the size or voltage of the current so-called "instrument transformers" have to be employed.

One of the further objects of the invention is to obviate and overcome the error of the meter readings due to ratio error and phase angle error of the instrument transformer. Due to the exciting component of the transformer, the transformation ratio is slightly different from the ratio of the number of turns in the primary and secondary windings, and this difference, which is customarily called transformation error or ratio error, causes an inaccuracy in the reading of the meter. The same is true of phase angle error, as will be set forth hereinafter.

Referring to Figure 1, A represents a current transformer with the primary coil P and the secondary coil S. The primary P is connected into the current circuit of the generator G.

The secondary is connected to a meter M. This represents a customary connection. D represents an auxiliary transformer of small capacity. The primary $p$ of this auxiliary transformer D is connected in series with the primary P of transformer A in the current circuit of the generator G. The secondary $s$ is connected in parallel with the primary P of the main transformer A. The auxiliary transformer D is made of such a ratio as to add or subtract, according to the direction of winding of the secondary $s$, a small amount of current to the current flowing through the primary P, thus indirectly modifying the transformation ratio of the current transformer A so as to bring the reading of the meter M to the correct value.

Referring to Fig. 2, the same object is accomplished by connecting the secondary $s$ of the auxiliary transformer D in parallel with the secondary S of the transformer A. In this case the transformer ratio of the transformer D is chosen as many times larger than the ratio of the main transformer A, in order to add or subtract the proper amount of current to or from the current flowing through the meter M.

Referring to Fig. 3, the same object is also accomplished by connecting the transformer D with its primary $p$ in series with the secondary S of the transformer A and the secondary $s$ of the transformer D in parallel with the secondary S of the transformer A. In this case the transformation ratio of the current transformer D is chosen similar in size to that employed in Fig. 1, only of smaller current capacity to take care of the smaller current transformed, which is smaller corresponding to the ratio of the transformer A.

The same combination illustrated in Figs. 1, 2 and 3 is used to eliminate or compensate for phase-angle between the generator current I, flowing through the primary P and secondary current Sc flowing in the secondary S of the current transformer A. In every one of these three arrangements, the auxiliary transformer D produces a secondary current in the secondary $s$, which similar to the main transformer A has a time displacement against its primary current, flowing through the primary $p$.

In connecting the secondary $s$ of the auxiliary transformer D so as to be in opposition to the current flowing in the particular coil to which it is connected, the time displacement of the resultant current, flowing through the meter M will be reduced and it can easily be proven mathematically that under a certain condition of ratio and phase-angle of the two transformers A and D that the resultant phase-angle, or rather the phase-angle between the resultant current, flowing through meter M and the primary current I flowing in the circuit of generator G is zero.

Referring to Fig. 10,

E = line voltage or voltage of generator G.
I = line current in circuit of generator G.
Sc = secondary current of transformer A.
$a$ = phase-angle of transformer A.
$sc$ = secondary current of auxiliary transformer D.
$b$ = phase angle of auxiliary transformer D.
Mc = meter current.
Cos F = P. F. of load or lag of I.

For absolute corrections of phase-angle the following equations must hold:

$$Sc \times \sin a = sc \sin b$$

or $$\sin b = \frac{Sc}{sc} \sin a.$$

This latter formula may also be written as $$\frac{\sin b}{\sin a} = \frac{Sc}{sc}.$$

It is also possible to substitute for the second term an expression involving only the turn ratios of the two transformers, thus:

$$\frac{I}{Sc} = \text{Ratio of main transformer} = R$$

$$\frac{I}{sc} = \text{Ratio of auxiliary transformer} = r$$

Therefore $$\frac{r}{R} = \frac{Sc}{sc}$$

Thus $$\frac{\sin b}{\sin a} = \frac{r}{R}, \text{ by substitution.}$$

This means simply that for accurate phase compensation, it is necessary to make the sines of the phase displacement angles of the two transformers of the same relative values as the ratios of transformation. Since these angles are always small, the angles themselves could be substituted without substantial error, and the final form of the formula is:

$$\frac{b}{a} = \frac{r}{R}$$

When this condition is fulfilled, the phase angle errors of the two transformers neutralize each other, and the overall error in measurement is reduced to a minimum. This phase angle correction is especially important in wattmeters and watthour-meters.

The same correcting effects produced by the secondary or output of the auxiliary transformer D as illustrated in Figs. 1, 2 and 3, applying to current transformer, apply equally well to potential transformers as shown in Figs. 4, 5 and 6. The interconnecting of the transformers A and D are the same as in Figs. 1, 2 and 3 respectively. What was in Figs. 1 to 3 the meter circuit is in Figs. 4 to 6, the generator circuit and vice versa. In all diagrams the principal idea is to compensate with the secondary output of the auxiliary transformer D the error in the reading of the meter M, produced by the errors in transformation of the transformer A.

The above applies also to the modifications shown in Figs. 7, 8 and 9 with the difference that potential is applied to the meter M to measure in conjunction with the current, wattage.

Figure 11:
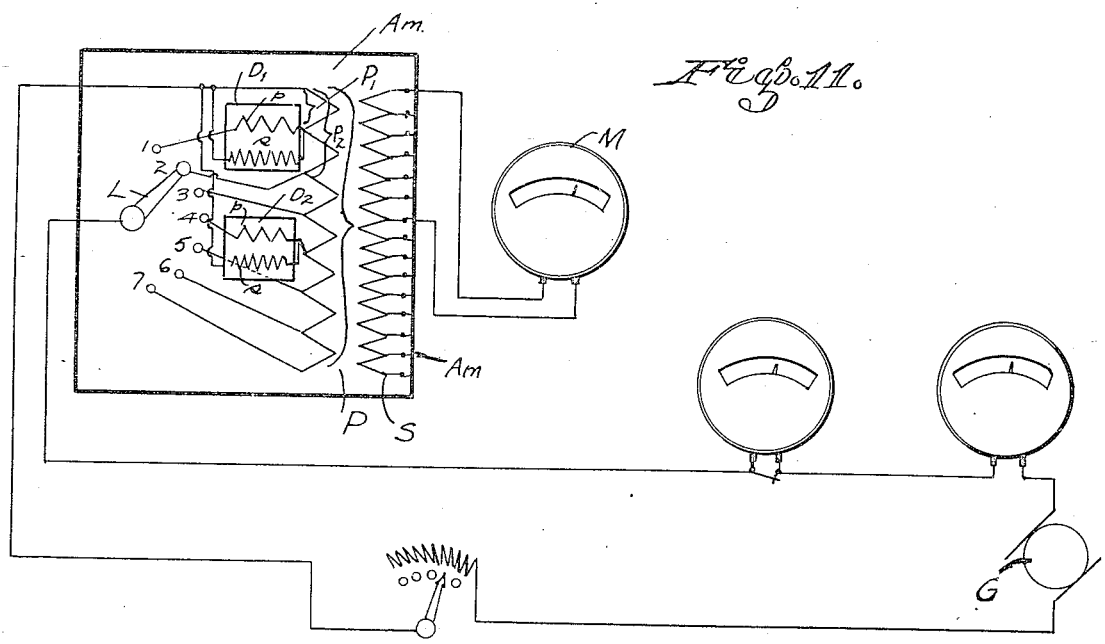

Referring to Fig. 11, the same object, namely, that of ratio error correction is accomplished here for a multiple range current transformer "A$m$" for measuring the electricity output of the generator G as was accomplished in Fig. 1 by means of a single range instrument transformer A.

In Figs. 1–9 the instrument transformer had one primary P. In Fig. 11, the multiple range instrument ratio transformer "A$m$" has a primary with a number of taps 1, 2, 3, 4, 5, 6, and 7. By putting the lever L on tap 1 the primary $P_1$ is cut in and the current from generator G passes just like in Fig. 1 through the primary $p$ of the auxiliary transformer $D_1$ and then to the primary $P_1$ of the multiple range transformer "A$m$." If we set lever L on tap #2, the current from the generator G passes only through the primary $P_2$ of the instrument transformer "A$m$", and therefore the transformation takes place like in any common instrument transformer; that is, the primary current is transformed and the transformed current flows through secondary S into the meter M. If we put the lever L on tap #4, the auxiliary transformer $D_2$ is interposed with the result as just explained for the tap #1, in other words, by applying the auxiliary transformer D in similar fashion as diagrammatically shown in Figs. 1, 2, 3, and 7, 8 and 9, it is possible to correct individual taps of the multiple ratio transformer so that for the same current flowing in meter M there will have to be current flowing in the different primaries which can be made to follow a certain progression.

As far as I am aware, no practical multiple range instrument transformer has been designed, in which, under given load conditions, the ratio of primary to secondary current is in whole numbers, particularly if a common secondary is used for a number of ratios in a single transformer, such as is described in my copending application Serial No. 132,246, filed November 20, 1916. In such an instance, only a limited number of ratios can be incorporated in a single transformer. For instance, if we assume a secondary having 360 turns, it is possible to obtain transformer ratios of 1 to 2, 1 to 3, 1 to 4, 1 to 5, 1 to 6, 1 to 9, 1 to 10, etc., 2 to 3, 2 to 5, 4 to 5, etc., but impossible to obtain transformer ratios of 1 to 7, 1 to 8, 2 to 7, etc., since 7 and 8 are not divisible into 360. The 1 to 7 and 1 to 8 ratios would require impossible primary turns of 25.7 and 22.5 respectively. In calibrating instruments it is essential to be able to proportion currents in successive steps from 1 to 10 or 1 to 15, but heretofore this has been impossible. I overcome this disadvantage by associating the auxiliary transformers with the primary taps of the multiple range instrument transformer and so modify the primary current that currents in these heretofore practically impossible ratios are obtained.

Figure 12:
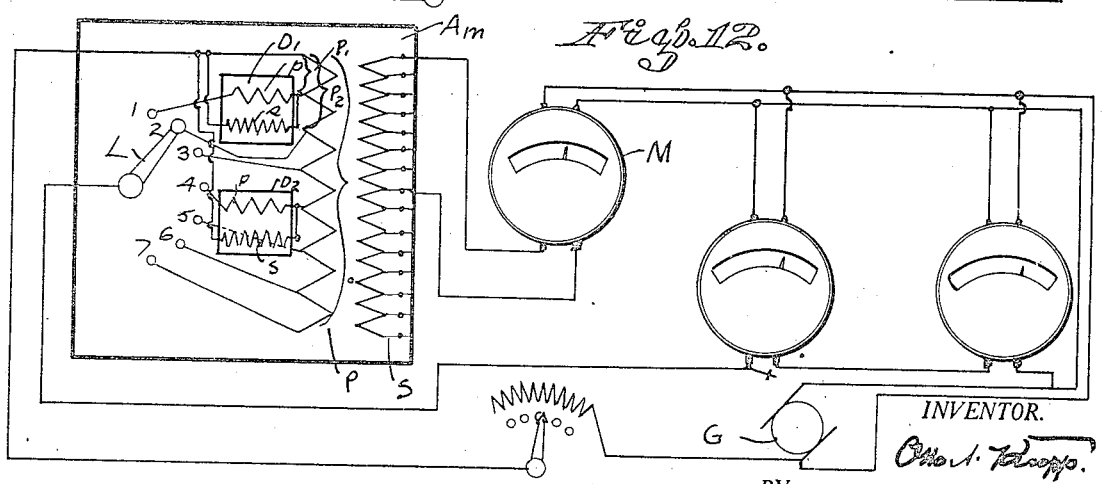

Fig. 12 shows the same principle as is illustrated in Fig. 11 applied to a wattmeter, the only difference being that the instruments have a common potential applied to them.

Having thus described my invention, what I claim and desire to secure by Letters Patent is:

1. In an instrument transformer for transforming one of the characteristics of a circuit so that an instrument of comparatively small size may be used with the circuit, a primary coil adapted to be connected to the circuit, a secondary coil adapted to be connected to an instrument, and an auxiliary transformer comprising a pair of coils in mutual inductive relation, one of the pair of coils being adapted to be energized in accordance with that characteristic of the circuit which is reduced by the instrument transformer, and the other connected so as to influence the instrument.

2. In an instrument transformer for transforming the current flowing in a circuit so that an instrument of comparatively small size may be used with the circuit, a primary coil adapted to be placed in series relation with the circuit, a secondary coil adapted to be connected to an instrument, and an auxiliary transformer comprising a pair of coils in mutual inductive relation, one of the pair of coils being adapted to be placed in series relation with the circuit, and the other connected across the primary coil.

3. In an instrument transformer for transforming one of the characteristics of a circuit so that an instrument of comparatively small size may be used with the circuit, a primary coil, taps on said coil whereby the number of active turns may be varied, said primary coil being adapted to be connected to the circuit, a secondary coil adapted to be connected to an instrument, and an auxiliary transformer comprising a pair of coils in mutual inductive relation, one of the pair being in series relation with the active turns of the primary coil so as to be energized from the circuit, and the other of the pair being in parallel with the active turns.

4. In an instrument transformer for transforming the current flowing in a circuit so that an instrument of comparatively small size may be used with the circuit, a primary coil, a plurality of taps on said coil whereby the number of active turns may be varied, said primary coil being adapted to be connected in series with the circuit measured, a secondary coil adapted to be connected to an instrument, and an auxiliary transformer comprising a pair of coils in mutual inductive relation, one of the pair being adapted to be energized in accordance with the current flowing through the circuit measured, and the other adapted to be connected in parallel to the active turns of the primary coil.

5. In an instrument transformer for transforming one of the characteristics of a circuit so that an instrument of comparatively small size may be used with the circuit, a main transformer having a primary coil adapted to be connected to the circuit, and a secondary coil adapted to be connected to an instrument, and an auxiliary transformer comprising a pair of coils in mutual inductive relation, one of the pair of coils being adapted to be energized in accordance with that characteristic of the circuit which is reduced by the instrument transformer, and the other connected so as to buck the effect of the primary coil of the main transformer, the two transformers being so constructed that a cause of error in the main transformer and a cause of error in the auxiliary transformer have substantially the same relative values as the ratios of transformation, whereby the error due to these causes is neutralized.

6. In an instrument transformer for transforming one of the characteristics of a circuit so that an instrument of comparatively small size may be used with the circuit, a main transformer having a primary coil adapted to be connected to the circuit and a secondary coil adapted to be connected to an instrument, and an auxiliary transformer comprising a pair of coils in mutual inductive relation, one of the pair of coils being adapted to be energized in accordance with that characteristic of the circuit which is reduced by the instrument transformer, and the other connected so as to buck the effect of the primary coil of the main transformer, the two transformers being so constructed that the phase angle errors of the two transformers have substantially the same relative values as the ratios of transformation, whereby the error due to the shift in phase is neutralized.

In testimony whereof I have hereunto set my hand at San Francisco, California, this 19th day of February, 1917.

OTTO A. KNOPP.

In presence of—
A. J. HENRY,
BALDWIN VALE.